US009682524B2

(12) United States Patent
Paeper

(10) Patent No.: US 9,682,524 B2
(45) Date of Patent: Jun. 20, 2017

(54) PELLETIZING OR GRANULATING APPARATUS

(71) Applicant: BP Recycling Systems GmbH, Hofstetten (CH)

(72) Inventor: Bernd Paeper, Hofstetten (CH)

(73) Assignee: BP RECYCLING SYSTEMS GMBH, Hofstetten (CH)

( * ) Notice: Subject to any disclaimer, the term of this patent is extended or adjusted under 35 U.S.C. 154(b) by 0 days.

(21) Appl. No.: 14/770,631

(22) PCT Filed: Feb. 18, 2014

(86) PCT No.: PCT/EP2014/053133
§ 371 (c)(1),
(2) Date: Aug. 26, 2015

(87) PCT Pub. No.: WO2014/131657
PCT Pub. Date: Sep. 4, 2014

(65) Prior Publication Data
US 2016/0001517 A1   Jan. 7, 2016

(30) Foreign Application Priority Data

Feb. 26, 2013   (CH) .................................... 513/2013

(51) Int. Cl.
*B29B 9/06*       (2006.01)
*B30B 11/20*      (2006.01)
(Continued)

(52) U.S. Cl.
CPC .............. *B30B 11/208* (2013.01); *B29B 9/06* (2013.01); *B30B 11/201* (2013.01);
(Continued)

(58) Field of Classification Search
CPC ....... B29B 9/06; B30B 11/201; B30B 11/202; B30B 11/207; B30B 11/208
See application file for complete search history.

(56) References Cited

U.S. PATENT DOCUMENTS

| 1,868,370 A | 7/1932 | Sizer |
| 2,295,838 A | 9/1942 | Glaze |

(Continued)

FOREIGN PATENT DOCUMENTS

| CH | 594494 | 1/1978 |
| DE | 2733062 | 2/1978 |

(Continued)

OTHER PUBLICATIONS

International Preliminary Report on Patentability dated Sep. 1, 2015 for PCT/EP2014/053133.
(Continued)

*Primary Examiner* — James Mackey
(74) *Attorney, Agent, or Firm* — Paul D. Bianco; Katharine Davis; Fleit Gibbons Gutman Bongini & Bianco PL

(57) ABSTRACT

An apparatus for producing pellets from bulk material, in particular soft bulk material provided with meltable fractions, for example waste, plastics material or household refuse. The apparatus includes an annular die in which there are radially oriented pressing channels that extend from an inner surface of the annular die to an outer surface of the annular die. The annular die has a horizontal rotation axis passing through the midpoint thereof and is configured to be drivable in a rotation direction by a drive unit, and the annular die bounds a compression chamber, and has at least one working koller wheel, arranged in the compression chamber, for compressing and pressing the bulk material to be pelletized into the pressing channels. The apparatus can have a first and a second machine body, with the two (Continued)

machine bodies separable in the direction of the horizontal rotation axis of the annular die. The annular die is mounted in the first machine body and the at least one working koller wheel is mounted in the second machine body.

16 Claims, 7 Drawing Sheets

(51) Int. Cl.
*B30B 15/34* (2006.01)
*B29K 105/26* (2006.01)

(52) U.S. Cl.
CPC .......... *B30B 11/202* (2013.01); *B30B 11/207* (2013.01); *B30B 15/34* (2013.01); *B29K 2105/26* (2013.01)

(56) References Cited

U.S. PATENT DOCUMENTS

| | | | |
|---|---|---|---|
| 2,626,576 A | 1/1953 | Meakin | |
| 3,932,091 A | 1/1976 | Vink | |
| 3,981,664 A * | 9/1976 | Bittner | B30B 11/201 241/122 |
| 4,148,596 A | 4/1979 | Schultz | |
| 4,711,622 A | 12/1987 | Schaffner | |
| 6,162,038 A * | 12/2000 | Cefaretti | B30B 11/202 411/352 |
| 8,974,710 B2 * | 3/2015 | Blok | B30B 11/208 264/118 |
| 2014/0138865 A1 | 5/2014 | Blok et al. | |

FOREIGN PATENT DOCUMENTS

| | | |
|---|---|---|
| DE | 2917453 | 11/1980 |
| DE | 3345407 | 6/1985 |
| DE | 4422403 | 6/1995 |
| EP | 0172359 | 2/1986 |
| EP | 0687273 | 12/1995 |
| EP | 0694380 | 1/1996 |
| EP | 2517870 | 10/2012 |
| FR | 1115893 | 4/1956 |
| WO | 9420541 | 9/1994 |
| WO | 2012146696 | 11/2012 |

OTHER PUBLICATIONS

Written Opinion of the International Searching Authority dated Sep. 1, 2015 for PCT/EP2014/053133.
International Search Report dated Mar. 27, 2014 for PCT/EP2014/053133.

* cited by examiner

PELLETIZING OR GRANULATING APPARATUS

TECHNICAL FIELD

The invention pertains to an apparatus for producing pellets from bulk material.

PRIOR ART

Various apparatuses for producing pellets from bulk material are known, e.g., from CH594494, DE 2733062, EP172359 and WO2012146696. Such apparatuses are also referred to as pellet mills and feature an annular die, in which radially oriented pressing channels are formed. In its inner region, the annular die defines a compaction chamber. These annular dies are usually arranged vertically, wherein the compaction chamber is closed by means of corresponding sidewall elements. Two or three pressure rollers are situated in the compaction chamber, wherein the annular die or the pressure rollers are driven such that bulk material being introduced into the compaction chamber is compacted and pressed through the pressing channels (also referred to as fraction channels).

Different types of materials such as, e.g., plastic, paper, wood, garbage, coal or organic materials and dustlike or powdery waste of all types are processed into highly compacted pellets by means of such apparatuses.

During the penetration of the pressing channels, the bulk material is compacted into die-formed articles. Due to the friction between the inner surface of the pressing channels and the outer surface of the die-formed articles, as well as the frictional heat generated thereby, the die-formed articles are highly compacted superficially such that they have a smooth surface, which encloses and holds together the pellets, after the compaction process.

The known apparatuses have been successfully used in the production of animal feed that is compressed into pellets. However, when apparatuses of this type, which are intended for pelletizing animal feed and feature two or more pressure rollers, are used for pelletizing soft materials such as, e.g., plastic or waste containing plastic, the material to be pelletized is heated due to the turbulence, the friction and the compression between the pressure rollers such that the plastic fractions melt and the material distribution underneath the pressure surface decreases, wherein this may lead to the material clumping together or even assuming a smeary consistency.

Such clumping or smearing is particularly problematic in the start-up phase of the apparatus because the pressing channels are clogged with cold material and the waste material compressed between the pressure roller and the die smears along the inner surface of the die and cannot be pressed through the pressing channels due to its increasingly smeary consistency. In front of the pressure roller, the heated and compacted material accumulates into a start-up cake, the consistency of which becomes increasingly smeary, such that the material compaction between the die and the pressure rollers is reduced and the pressure rollers slide along the die without turning. Normal operation of the apparatus is then no longer possible.

In order to avoid the risk of such smearing in the pelletizing of waste material, the waste material to be introduced into the apparatus is dried to a residual moisture of 5 to 10 percent because the water content acts as a lubricant in the waste material and a high water content increases the risk of the waste material smearing between the die and the pressure rollers. Excessive moisture would furthermore prevent a stable pellet structure because the pellet would expand after the pressing operation and heating of the compact such that a so-called "fluff pellet" would be created. A reduction of the residual moisture merely lowers the risk of smearing, but cannot completely eliminate this risk.

Another disadvantage can be seen in that wedging of the bulk material is more likely when several pressure rollers are used due to the large angular aperture between the pressure roller pressing surface and the inner die surface. This wedging in fact can cause the pressure roller to become blocked, wherein this results in immediate heating of the material and a melting process of mixed plastic waste (as it is the case in waste processing for pelletizing processes). This can lead to fires in the compaction chamber.

Consequently, relatively soft materials such as, e.g., household garbage, plastic or general waste can only be pelletized with low material throughput by means of known apparatuses featuring two or more pressure rollers. Depending on the type and composition of the material to be pelletized, the clumps may have a soft, smeary consistency that leads to smearing of the pressure rollers or a high firmness that leads to blocking of the apparatus. When processing soft materials containing meltable fractions, the quantity of material fed into the apparatus therefore needs to be maintained so small that such clumping cannot occur.

Apparatuses of the type described, e.g., in EP0687273 were proposed in order to counteract smearing in the pelletizing of relatively soft materials such as, e.g., household garbage, plastic or general waste. This apparatus features a large working pressure roller and a smaller supporting pressure roller, wherein the large working pressure roller has a significantly smaller angular aperture than apparatuses with several working pressure rollers. This in turn increases the compaction length, i.e. the distance between the starting point of the compaction of the bulk material and the contact point between the working pressure roller and the annular die, at which the compaction is concluded.

A small compression angle means that the spacing between the outer surface of the working pressure roller and the inner surface of the annular die slowly decreases over the relatively long compaction length such that the compressive forces act very uniformly upon the bulk material introduced between the working pressure roller and the annular die over the entire compaction length. In this way, identical pressures are achieved in all pressing channels.

In known apparatuses, the annular die and the working pressure roller are respectively mounted on one side of the machine body such that the other side is freely accessible for feeding bulk material into the apparatus. The annular die typically is seated on a horizontally mounted hollow driveshaft and predominantly driven by means of belts or synchronous belts or via a gearing. The feed openings are arranged on the opposite side. The pressure rollers are fixed on a second shaft extending through the hollow driveshaft and rotatably mounted therein. For space reasons, the shafts have a relatively high leverage. Due to the high own weight of the pressure rollers and the annular die, the bearings are subjected to high loads and therefore significant wear. Pellet mills with several working pressure rollers or one working pressure roller and at least one supporting pressure roller have been proposed in order to respectively reduce or distribute the forces acting upon the bearings. In a few apparatuses, the pressure roller configuration within the die is realized in such a way that 2-3 or 4 pressure rollers generate a self-centering function referred to the die running surface when pressure is exerted and compressive forces of one pressure roller can be absorbed by the opposite pressure roller.

U.S. Pat. No. 2,295,838 discloses an apparatus with a single pressure roller, in which the annular die and the pressure roller are mounted on opposite sides. In order to perform maintenance work on the apparatus or to exchange the annular die, the apparatus must be disassembled on the pressure roller side or the pressure roller can be pivoted upward. In order to realize this pivoting motion, the rotational axis of the pressure roller must lie on the vertical diameter line of the annular die due to the size of the pressure roller such that the pressure roller does not abut on the annular die during the pivoting motion. However, this means that the material feed must be arranged vertically above the pressure roller, which in turn can once again leads to smearing and blocking.

DISCLOSURE OF THE INVENTION

The invention is based on the objective of additionally improving an apparatus, by means of which soft materials containing meltable fractions such as, e.g., waste, plastic or household garbage can be pelletized with high throughput and in which the risk of smearing or blocking the apparatus is eliminated, wherein the invention also aims to additionally reduce the risk of smearing or blocking, as well as to respectively simplify maintenance procedures and broaden the application spectrum of the apparatus.

This objective is attained by the apparatus described and shown herein. The inventive apparatus for producing pellets from bulk material, particularly soft bulk material containing meltable fractions such as, e.g., waste, plastic or household garbage, comprises an annular die, in which radially oriented pressing channels are formed, wherein said pressing channels extend from an inner surface of the annular die to an outer surface of the annular die. The annular die has a rotational axis that is aligned horizontally and extends through its center, wherein the annular die is realized such that it can be driven in a rotating direction by a drive unit, preferably a hydraulic drive. The annular die defines a compaction chamber. At least one working pressure roller is arranged in the compaction chamber in order to compact and press the bulk material to be pelletized into the pressing channels. The apparatus furthermore features a first and a second machine body, wherein the annular die is rotatably mounted in the first machine body and the at least one working pressure roller is rotatably mounted in the second machine body, and wherein at least one of the two machine bodies is displaceably mounted, preferably on a foundation and/or on a superstructure, such that the at least one working pressure roller can be displaced relative to the annular die in the direction of the rotational axis of the annular die.

In this way, the annular die can be directly driven on the die shaft, e.g., by means of a hydraulic drive such that failure-prone belts, pulleys and gearings are eliminated. Simple maintenance or a simple exchange of the working pressure roller is respectively ensured in that the two machine bodies and therefore the annular die and the working pressure roller can be easily pulled apart in the axial direction, wherein this also allows the use of individual large pressure rollers. In an apparatus with a single large working pressure roller, a supporting pressure roller can also be eliminated due to the mounting of the annular die and the working pressure roller in two separable machine bodies.

Advantageous embodiments of the invention are characterized in the dependent claims.

In a preferred embodiment of the inventive apparatus, the first machine body and/or the second machine body is mounted on a foundation and/or on a superstructure such that it can be displaced along the horizontal rotational axis of the annular die, e.g., by means of sliding bearings. The displacement is preferably driven hydraulically.

In another preferred embodiment of the inventive pellet mill, only a single working pressure roller is arranged in the compaction chamber. The rotational axis of the working pressure roller is arranged underneath the horizontal diameter line of the annular die and past the vertical diameter line of the annular die referred to the rotating direction of the annular die.

The position of the pressure roller configuration is chosen in such a way that bulk material, which is introduced by means of a feed shaft, a feed screw, a lifting cylinder or another force-feed mechanism such as slides, pistons, etc., ends up directly underneath the working pressure roller due to the force of gravity. The bulk material cannot separate into its inhomogeneous composition due to different bulk weights. This also prevents undesirable turbulences such that excessive heating of the bulk material is in turn inhibited. The risk of clumping of soft materials containing meltable fractions can be additionally reduced. Furthermore, no material build-up can occur due to the rotation and the centrifugal force in front of an otherwise provided supporting pressure roller. Bulk material that nevertheless ends up in the upper region is able to fall down again in an unobstructed fashion.

The inventive pressure roller configuration furthermore has the advantage that only insignificant amounts of bulk material are respectively located in the inlet region and in the compaction chamber during a malfunction due to a blockage by foreign objects or overfeeding. When overfeeding or smearing occurs in conventional pressure roller configurations, e.g., with 2 to 3 or 4 pressure rollers, the bulk material is in contrast distributed in the entire compaction chamber in the form of an overheated paste (that can ignite) and may result in interruptions lasting several hours. The operating times of the apparatus therefore could also be significantly increased with the inventive pressure roller configuration.

In a preferred embodiment of the inventive pellet mill, only a single working pressure roller is arranged in the compaction chamber. The outside diameter of the working pressure roller preferably amounts to 0.6-times to 0.8-times the inside radius of the annular die. The working pressure roller preferably is arranged past the vertical diameter line of the annular die in such a way that the angle between the diameter line and the vertical diameter line lies between 10° and 30°, preferably at about 20°. The annular die and the working pressure roller may have a width of up to 300 mm, preferably up to 500 mm. It is preferred that the annular die and the working pressure roller have a width of 350 to 500 mm. The inside diameter of the annular die preferably amounts to about 1500 mm.

The rotational axis of the working pressure roller preferably is respectively spaced apart from the inner surface of the annular die by at least the radius of the working pressure roller such that the respective outer surface of the working pressure roller is in contact and frictionally engaged with the inner surface of the annular die or with a slab of bulk material that may be pressed against the inner surface of the annular die.

The spacing between the working pressure roller and the annular die can be variably adjusted, e.g., by mounting the working pressure roller in the second machine body in such a way that it can be vertically displaced perpendicular to the horizontal rotational axis of the annular die, e.g., by means of sliding bearings. Furthermore, the working pressure roller is mounted in the second machine body or the annular die is mounted in the first machine body such that they can be horizontally displaced relative to the foundation and/or superstructure perpendicular to the horizontal rotational axis of the annular die, e.g., by means of sliding bearings. In this way, the working pressure roller can be fixed in a certain position relative to the annular die or pressed against the running surface of the annular die or the slab with a certain pressure by means of an automatic distance control.

In order to realize such a distance control, it is preferred to provide an adjusting device for the working pressure roller, by means of which the position of the rotational axes of the working pressure roller can be automatically and/or continuously adjusted relative to the position of the horizontal rotational axis of the annular die. The automatic and/or continuous adjustment may take place in the form of an axial displacement realized by means of cams, rack guides or other types of adjusting mechanisms. During the operation of the apparatus, the automatic distance control can continuously vary the distance of the working pressure roller from the inner surface or running surface of the annular die. Frictional conditions of the type produced due to the length of the pressing channels can now be shifted into the compaction chamber by means of distance control (distance of the pressure rollers from the annular die), namely by producing a bulk material slab of sorts, through which the new input material initially needs to be pressed, between the pressure roller and the die. It is therefore no longer necessary to use annular dies with different thicknesses and bore hole depths and the tool costs are significantly reduced. In conventional apparatuses with 2-4 pressure rollers, this type of distance control can only be realized conditionally over minimal distances due to the pressure roller diameter/die diameter ratio. It is preferred that the distance control or the corresponding displacements are respectively driven hydraulically.

The compaction chamber is preferably defined by at least one sidewall and the at least one sidewall features a feed opening for introducing the bulk material to be pelletized. The feed opening is arranged in front of the working pressure roller referred to the rotating direction of the annular die such that bulk material introduced through the feed opening is directly fed to the working pressure roller, compacted and pressed into the pressing channels. The feed opening is preferably arranged on or underneath the horizontal diameter line of the annular die. A force-feed mechanism for the bulk material to be pelletized may be provided on the feed opening.

The inventive pellet mill may furthermore be provided with a feed mechanism, preferably a force-feed mechanism, for the bulk material to be pelletized, wherein said feed mechanism features a material outlet that leads into the compaction chamber. The material outlet is preferably arranged in front of the working pressure roller referred to the rotating direction of the annular die and underneath the horizontal diameter line of the annular die. The force-feed mechanism preferably features a material outlet leading into the compaction chamber. The force-feed mechanism may be realized, e.g., in the form of a feed screw channel that opens downward and rearward (i.e. away from the feed opening or the inlet) in the form of a gap. The material feed then takes place over the entire width of the annular die through the opening gap of the force-feed mechanism.

The particular advantage of a force-feed mechanism can be seen in that an optimal distribution of the bulk material in the compaction chamber is still ensured if the annular die and the working pressure roller are realized with a width of up to 500 mm. This widening of the compaction chamber leads to significantly increased pressing capacities The inventive pellet mill may furthermore feature a knock-off or cutting device that is arranged on the outer surface of the annular die underneath the horizontal diameter line of the annular die and past the diameter line of the annular die referred to the rotating direction of the annular die.

The knock-off or cutting device therefore is only arranged on the outer side of the die in the pressing region of the pressure roller and makes it possible to exactly define the pellet length. A multiple pressure roller configuration, in contrast, is dependent on different knock-off devices and the pellet discharge is not defined and combined at one location, but rather distributed all around the die. Consequently, several knock-off devices are required in order to obtain pellets that more or less have the same length. Soft pellets and pellets of inconsistent hardness are thrown against the enclosure of the die due to its circumferential speed and adhere thereto or are damaged in structure.

The arrangement of the knock-off or cutting device on the inventive apparatus has the advantage that separated pellets can drop onto a conveyor belt extending underneath the annular die in an unobstructed fashion due to the force of gravity, wherein this allows, e.g., the subsequent drying of soft or pasty pellets as it is required in the processing of sewage sludge.

It is preferred to use a hydraulic drive instead of the electric drives conventionally used in apparatuses of this type. In this context, it is particularly advantageous that load peaks caused by the inhomogeneous structure of the bulk material to be pelletized (e.g. waste containing soft and hard materials), which are directly transmitted to the electric motors and lead to surges in the power consumption, are largely eliminated with hydraulic drives. Instead of surges in the ampere consumption of the motors, the hydraulic system makes it possible to achieve power consumption values that only fluctuate slightly. The operating costs can furthermore be lowered because the electricity rates are frequently dependent on power peaks.

It is preferred to provide a proportional control for the drive and the material feed in order to subject the drive of the annular die and/or the working pressure roller to an even load and to achieve an optimal feed of the bulk material to be pelletized. For example, if the pressure of the hydraulic drive of the annular die increases above a preset value, the oil supply of the hydraulic drive of the feed mechanism and therefore the introduced quantity of bulk material is reduced. The corresponding pressure parameters can be variably adjusted.

It is furthermore preferred to provide a reversing and blockage control. For example, if the pressure of the hydraulic drive of the annular die exceeds a variably adjustable peak value for a predetermined time (e.g. one tenth of a second), the bulk material feed is stopped and the hydraulic drive of the annular die briefly reverses and stops or the hydraulic system switches to a blockage mode at the corresponding peak pressure and immediately decelerates the annular die with its centrifugal mass. For this purpose, the oil supply is stopped within milliseconds and the hydraulic motor decelerates due to the counterpressure.

In mechanical drives that operate with belts or gearings, the belts/pulleys or the gearing would be at least briefly overloaded and prone to failure when impurities or foreign objects such as rocks are processed. For this purpose, most apparatuses feature a shear pin system in the driveshaft which separates the drive from the compactor housing.

Emergency braking devices, which were previously realized in the form of disk brakes, shear pins or other mechanisms are eliminated because such instances are registered by the hydraulic drive with peak pressure detection and reversing circuit. A reversal or an immediate stop can be selectively triggered when a corresponding pressure is detected.

A blockage during the operating sequence, e.g., due to overfilling or overheating and clumping can be counteracted by automatically connecting the working pressure roller to a flexible hydraulic drive with variable torque and variable rotational speed.

Apparatuses with hydraulic drives therefore allow a reliable and less failure-prone operation than conventional apparatuses.

An additional and preferably hydraulic drive of the working pressure roller with different torques for driving the annular die makes it possible to utilize the apparatus for previously inconceivable applications such as granulating and separating materials.

In another preferred embodiment of the apparatus, the rotational axis of the working pressure roller can be inclined relative to the horizontal rotational axis of the annular die by up to 10 degrees. The working pressure roller may have a cylindrical or slightly conical shape.

The running surface of the working pressure roller and the annular die can be varied by pivoting the working pressure roller relative to the running surface of the annular die, namely by inclining the rotational axis of the working pressure roller in the direction of a diameter line of the annular die. This makes the apparatus suitable for the additional application of granulating and separating composite materials, e.g., of rubber and leather/textile or plastic/textile/paper.

The drive of the annular die and the working pressure roller with synchronous, asynchronous or respectively variable rotational speeds or a distribution of the torques over the unit subjected to the load (with hydraulic drives) also makes it possible to utilize the above-described apparatus as a granulating apparatus for breaking up and separating composite materials, e.g., of rubber and leather/textile or plastic/textile/paper. In this case, the annular die is used as a granulating device rather than a pressing element. Depending on its material, the annular die may have a constant thickness, but the pressing channels are counter-bored from outside such that the friction channel is reduced to a channel that merely has a screen function. This makes it possible to break up composite materials, e.g., of rubber and leather/textile or plastic/textile/paper by means of the apparatus or granulating apparatus and to produce granulates with the maximum fragmented size of the pellet diameters. The granulates can subsequently be separated by means of screening devices and weight-based separators. Analogous to a pelletizing process, the bulk material to be granulated is preferably fed to the apparatus in a fragmented size that can be metered. The granulating effect also can be respectively influenced or increased with the relative inclination between the rotational axes of the working pressure roller and the annular die.

A granulating apparatus of this type can also be considered as an independent invention.

In the above-described embodiments of the respective pelletizing or granulating apparatus, the annular die may also be realized without an annular die shaft and directly mounted on a bearing member of the first machine body. This direct mounting in connection with a working pressure roller shaft extending through the annular die allows a variable design of the apparatus with one or more—and also different—annular dies and/or working pressure rollers. In this case, several annular dies may be assembled into a drum.

In this case, the at least one annular die typically is held between two revolving outer flanges, by means of which it is rotatably mounted on a pair of bearing rolls per flange. The annular die may be alternatively mounted on two rolling bearings that are arranged parallel to one another. A suitably chosen spacing between the respective bearing rolls or rolling bearings ensures that the annular die is mounted in a stable fashion due to its own weight—if applicable in connection with a contact pressure generated by the working pressure roller during the operation of the apparatus or with additional supporting rolls that act upon the outer and/or inner side of the flanges from above. The bearing rolls may be arranged on two axes that extend parallel to the rotational axis of the annular die, wherein this is particularly advantageous with respect to the mounting stability of wide and heavy annular dies.

In this case, the working pressure roller may be held and, if applicable, driven by a shaft (working pressure roller shaft) that extends through the annular die and is on both sides mounted on a second machine body outside the annular die.

As already mentioned above, the annular die and/or the working pressure roller may in this directly mounted arrangement also be driven by means of individual mechanical or hydraulic drive units in order to realize a synchronous or asynchronous drive of the annular die and the working pressure roller or a frictional engagement of the annular die on the working pressure roller or vice versa. It goes without saying that electric and/or hydraulic drive units can be used in all embodiments of the apparatus depending on the respective requirements.

It also was already mentioned that the second machine body or the support/mounting of the working pressure roller may be realized in such a way that the at least one working pressure roller can be displaced relative to the at least one annular die in the direction of the rotational axis of the annular die.

The working pressure roller therefore can be simply pulled out in the axial direction in order to carry out maintenance procedures or to exchange the working pressure roller or the annular die. The working pressure roller shaft may be realized separably, particularly when several dies and working pressure rollers are provided, wherein this separability may be achieved, e.g., with a divided flange or with overlapping regions of the two shaft sections that engage into one another in a form-fitting and torque-proof fashion such that the working pressure rollers can be pulled out in the axial direction on both sides.

The displaceability in the axial direction can furthermore be used for allowing an oscillation of the working pressure roller relative to the annular die within a limited range of a few millimeters to centimeters. When several annular dies are used, this also makes it possible to change over a working pressure roller from one annular die to another annular die on demand.

The spacing between the working pressure roller and the annular die also can be variably adjusted with the aforementioned displaceability of the working pressure roller (in the vertical and horizontal direction perpendicular to the rotational axis of the annular die). If one working pressure roller is used—as described above—the inclination can also be adjusted and, if so required, may likewise oscillate.

One advantage of such a direct mounting arrangement can be seen in that several annular dies can be arranged in a row and assembled into a drum, wherein the annular dies are for this purpose preferably connected to intermediately arranged connecting flanges. In this case, the connecting flanges typically are also mounted on the rolling bearings or on additional bearing roll pairs.

The direct mounting furthermore makes it possible to realize a bulk material feed from both sides, namely by means of feed mechanisms of the above-described type that are arranged on both sides. This is particularly advantageous when a drum composed of several annular dies and one or more working pressure rollers are used.

The above-described direct mounting and the arrangement of several annular dies in a row could also be considered as an independent invention.

With respect to the above-described apparatuses, it is furthermore advantageous to realize the following characteristics individually or in any combination with the aforementioned characteristics:

The working pressure roller shaft may be realized in the form of a hollow shaft in order to produce a cooling water connection for actively cooling the working pressure roller;

The connecting flange and/or outer flange may protrude radially inward over the annular die with the radially arranged pressing channels in order to form individual compaction chambers.

The pressing channels of the individual annular dies may have different diameters and/or lengths and at the same time allow the production of different pellets in the same machine.

BRIEF DESCRIPTION OF THE FIGURES

Exemplary embodiments of the invention are described in greater detail below with reference to the drawings. In these drawings.

WAYS FOR REALIZING THE INVENTION

Figure 1:
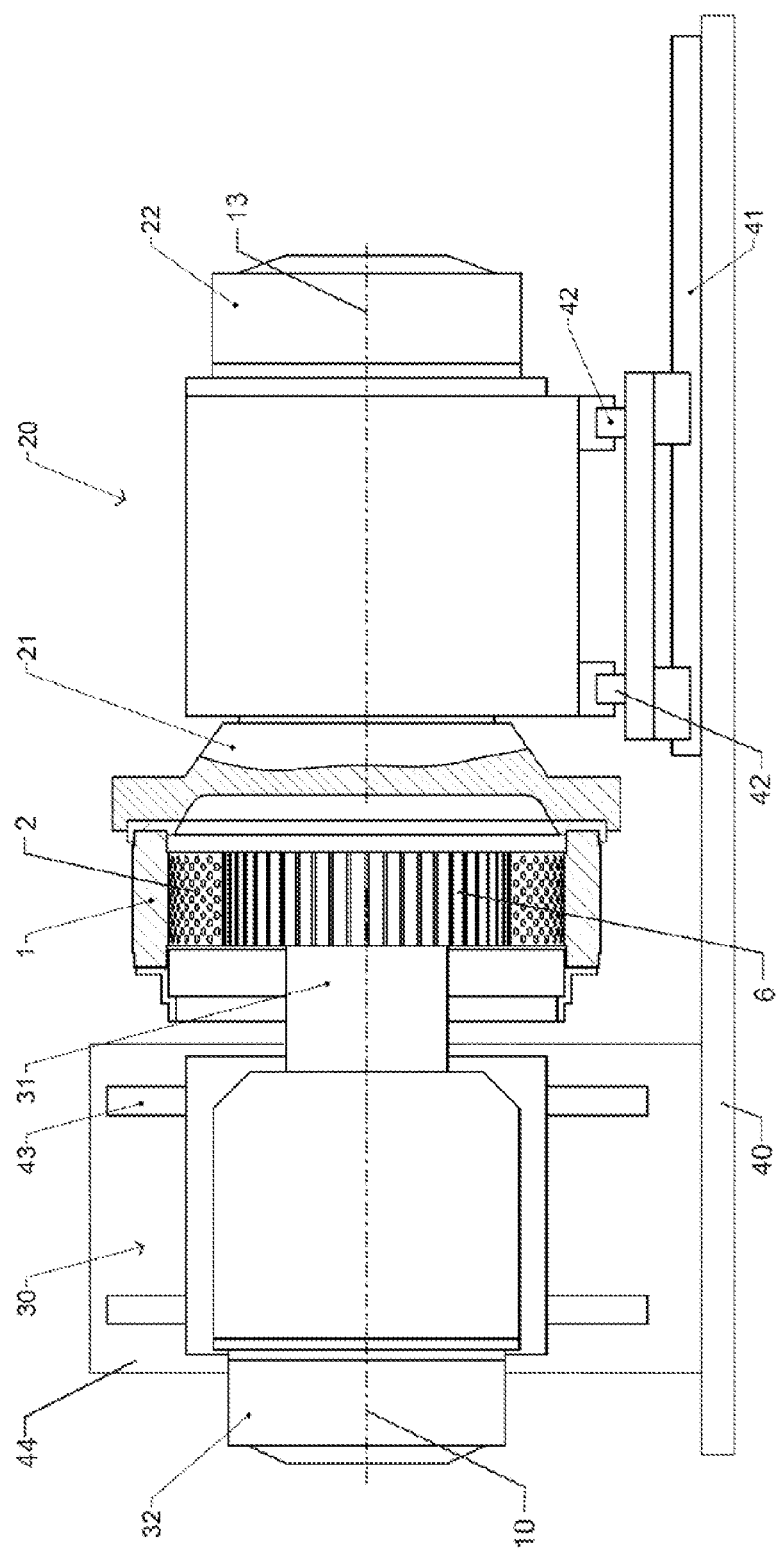
FIG. 1 shows a sectional representation of an embodiment of an inventive apparatus.
Figure 2:
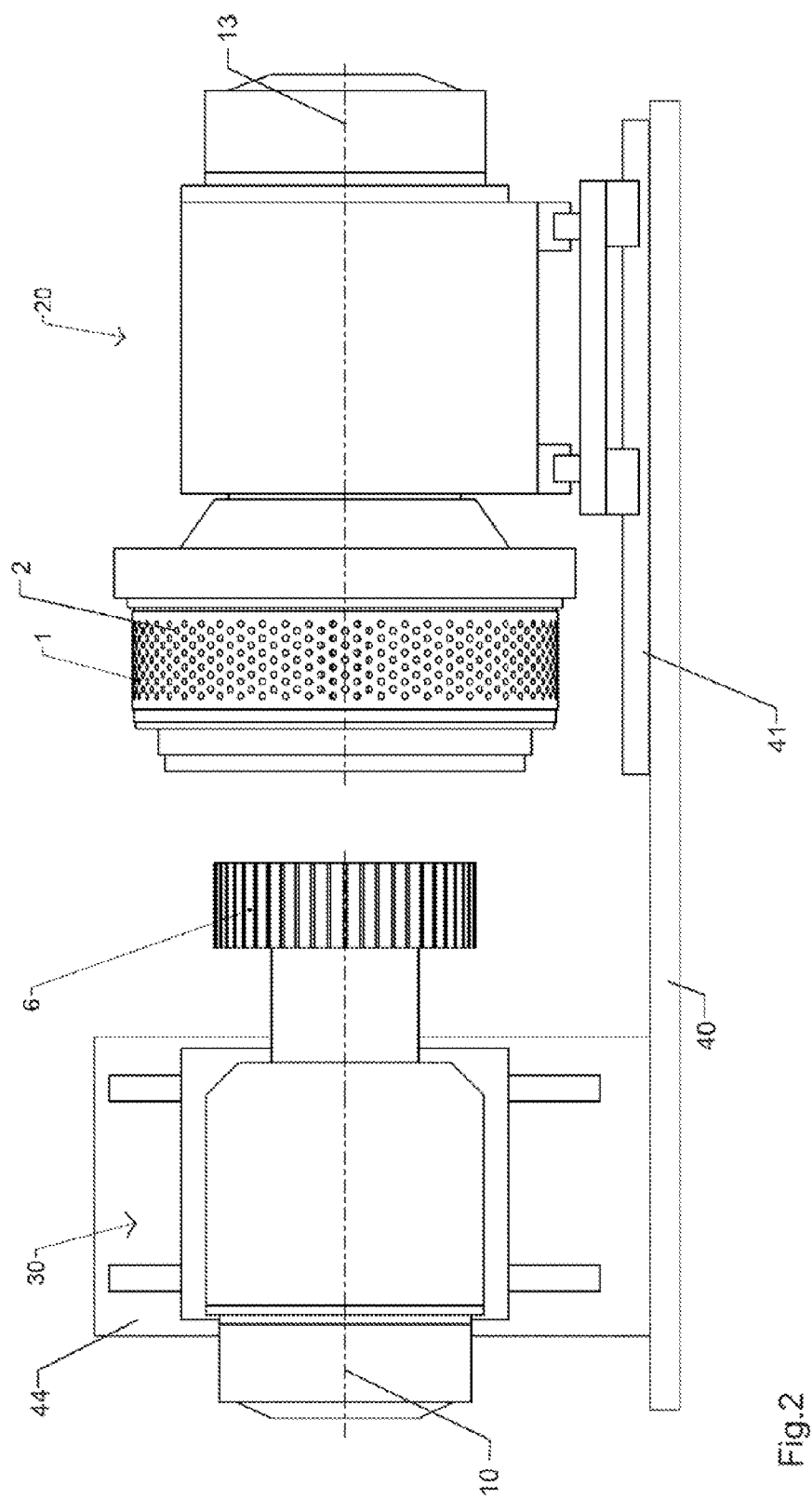
FIG. 2 shows a side view of the embodiment according to FIG. 1, in which the first and second machine bodies are separated.
Figure 3:
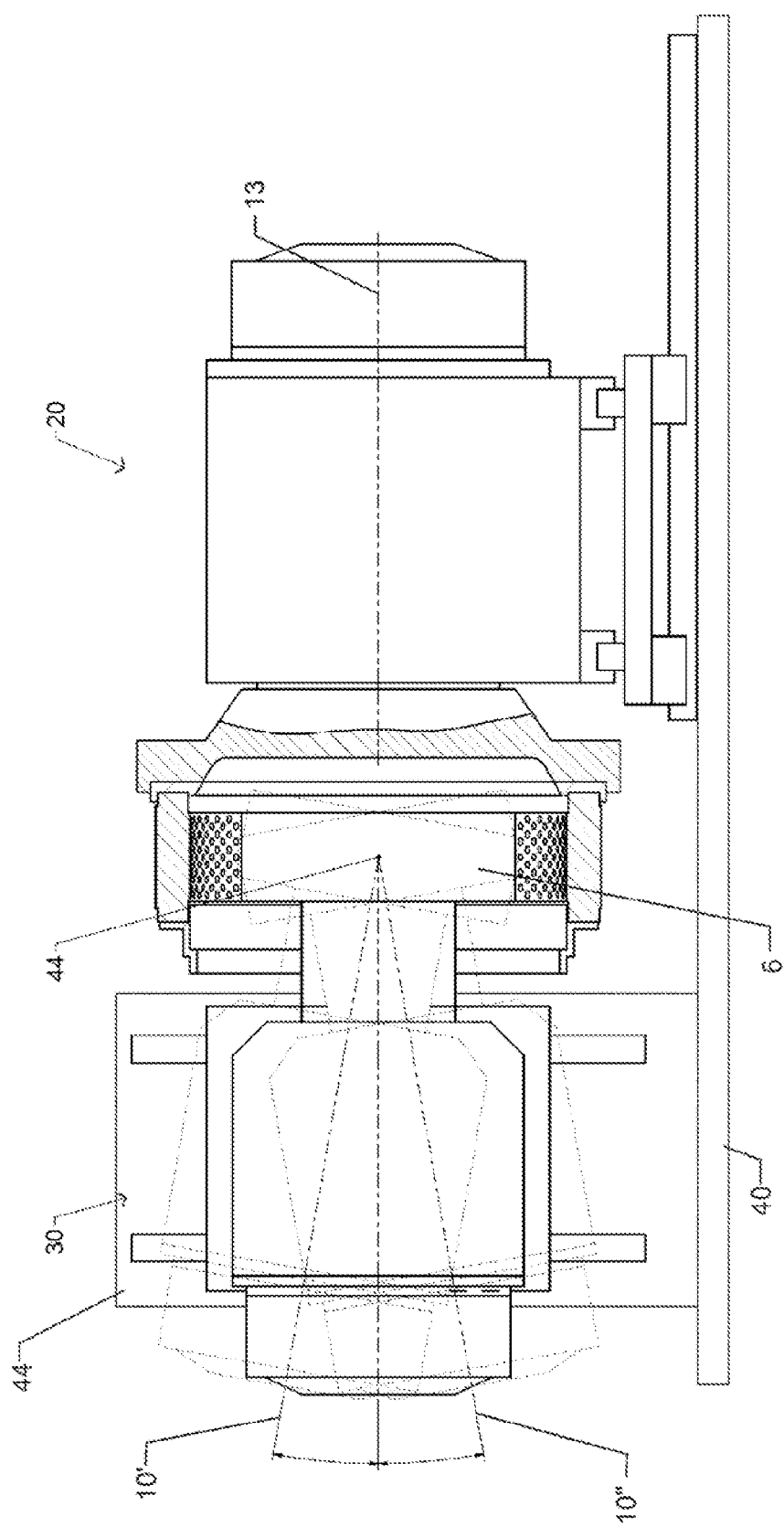
FIG. 3 shows a top view of the embodiment according to FIG. 1, in which the working pressure roller is inclined.

FIG. 1, FIG. 2 and FIG. 3 show an embodiment of an inventive apparatus with two machine bodies that can be separated in the direction of the horizontal rotational axis, wherein FIG. 2 shows the apparatus in the separated state and FIG. 3 shows the apparatus with an inclined pressure roller.

The apparatus features a first machine body 20 and a second machine body 30. A horizontal first shaft 21 is mounted in the first machine body 20 and an annular die 1 is arranged on the end of said shaft. The shaft 21 is driven by means of a hydraulic motor 22. The first machine body 20 is mounted such that it can be displaced in the direction of the rotational axis 13 of the annular die 1 on a first sliding bearing 41 of a foundation 40. The first machine body is furthermore mounted such that it can be displaced perpendicular to the rotational axis 13 of the annular die 1 on a second sliding bearing 42 of a foundation 40.

A horizontal second shaft 31 is mounted in the second machine body and a working pressure roller 6 is arranged on the end of said shaft. The second shaft 31 is driven by means of a hydraulic motor 32. The second machine body 30 is mounted such that it can be vertically displaced perpendicular to the horizontal rotational axis of the annular die 1 in a third sliding bearing 43. Carriers 44 are preferably arranged on both sides of the second shaft 31 and respectively feature a third and a fourth sliding bearing 43.

Due to the arrangement of the different sliding bearings, the annular die and the working pressure roller can be easily pulled apart in the axial direction. During the operation of the apparatus, the spacing between the working surface of the annular die and the outer surface of the working pressure roller furthermore can be easily controlled.

The rotational axis of the working pressure roller 10, 10', 10" can be inclined relative to the horizontal rotational axis of the annular die 13. FIG. 3 shows the apparatus according to FIG. 1, wherein the rotational axis 10 of the working pressure roller is indicated into inclined positions 10', 10". The angle between the normal position 10 and the two inclined positions respectively amounts to about 10 degrees, wherein any angle between 0 and 20 degrees can be realized.

Figure 4A:
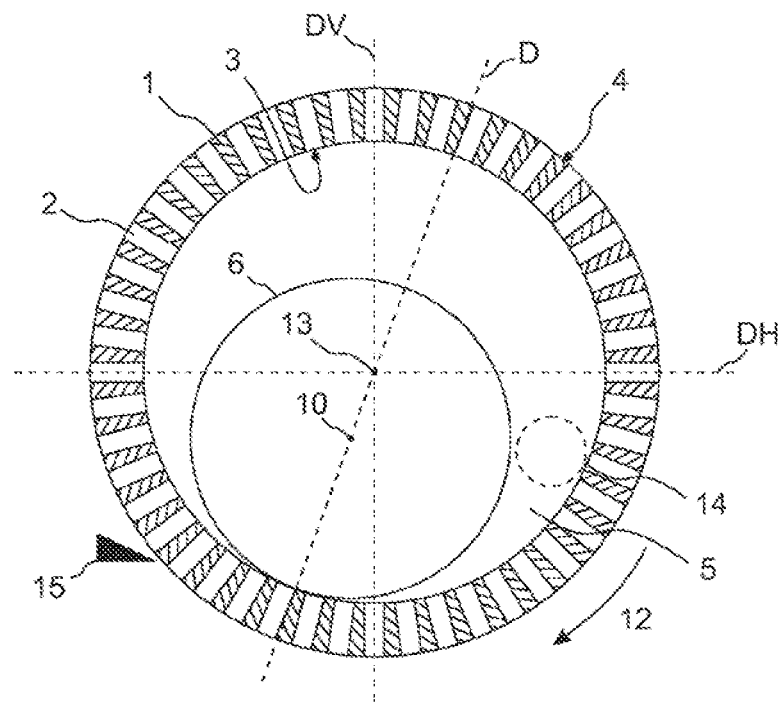
FIG. 4 shows a cross section through the annular die of an embodiment of the inventive apparatus with a single working pressure roller, namely with slab in part (a) and without slab in part (b)

FIGS. 4(a) and (b) show a cross section through the annular die of an embodiment of the inventive apparatus for producing pellets from bulk material, particularly soft bulk material containing meltable fractions such as, e.g., waste, plastic or household garbage. The apparatus features an annular die 1, in which radially oriented pressing channels 2 are formed which extend from an inner surface 3 of the annular die 1 to an outer surface 4 of the annular die 1. In its inner region, the annular die 1 defines a compaction chamber 5. A working pressure roller 6 is arranged in the compaction chamber 5. The working pressure roller 6 has an outer surface 8, by means of which it rolls on the inner surface 3 of the annular die 1.

Figure 4B:
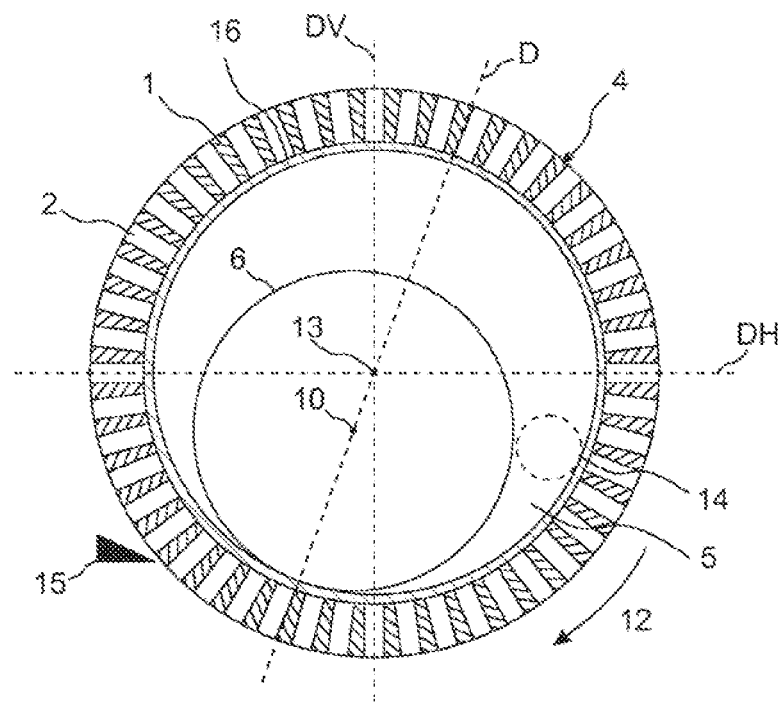

The working pressure roller 6 is mounted such that it is rotatable about a horizontal rotational axis 10 extending through its center. The rotational axis 10 is adjustably arranged in the apparatus on a diameter line D of the annular die 1, wherein the rotational axis 10 of the working pressure roller 6 or its center is respectively spaced apart from the inner surface 3 of the annular die 1 by at least its radius such that the outer surface 8 of the working pressure roller 6 is in contact with the inner surface 3 of the annular die 1 or with a slab 16 of bulk material (see FIG. 4(b)).

The adjustment of the working pressure roller 6 may take place automatically in the form of an axial displacement realized by means of cams, rack guides or other adjusting mechanisms. During the operation of the apparatus, the automatic pressure roller adjustment respectively can continuously vary the spacing between the working pressure roller 6 or the spacing of the working pressure roller 6 from the inner surface 3 of the annular die 1. Frictional conditions of the type produced due to the length of the pressing channels can now be shifted into the compaction chamber 5 by means of distance control (pressure roller vs. annular die). It is therefore no longer necessary to use annular dies with different thicknesses and bore hole depths and the tool costs are significantly reduced.

The annular die 1 is driven in the rotating direction indicated with the arrow 12 by means of a (not-shown) drive unit such that it rotates about a horizontal axis 13 extending through its center. The working pressure roller 6 is set in rotation about its rotational axis 10 in the rotating direction 12 due to a frictional engagement between its outer surface 8 and the inner surface of the annular die 1 or the slab 16 of bulk material, respectively. The scope of the invention also includes embodiments, in which the working pressure roller 6 is driven by means of a drive unit and the annular die 1 is driven due to the frictional engagement with the pressure roller 6.

The working pressure roller 6 is arranged in such a way that the rotational axis 10 of the working pressure roller 6 is arranged underneath the horizontal diameter line DH of the annular die 1 and past the vertical diameter line DV of the annular die referred to the rotating direction of the annular die. The diameter line D, on which the rotational axis 10 of the working pressure roller 6 is arranged, and the horizontal diameter line DH include an angle α [alpha] that lies between 10 degrees and 30 degrees, preferably at about 20 degrees. The outside diameter of the working pressure roller 6 lies between 0.6-times and 0.8-times the inside radius of the annular die 1.

The compaction chamber 5 formed within the annular die 1 is respectively defined in the axial direction by a front and a rear sidewall that are arranged axially in front of and behind the annular die 1 and cover the entire annular die 1. The front sidewall contains a feed opening 14 (illustrated with broken lines in FIGS. 1 and 2), to the outer side of which a material feed channel is attached. The feed opening 14 is arranged underneath the horizontal diameter line DH of the annular die 1 and directly in front of the pressing region of the working pressure roller 6 referred to the rotating direction 12.

The material feed channel may be conventionally realized in the form of a vertical feed pipe, the lower end of which features a curved end region that is directly attached to the feed opening 14. The bulk material to be pelletized is poured into the material feed channel and deflected into the compaction chamber 5 by the curved end region.

In a preferred embodiment, the apparatus is provided with a force-feed mechanism that actively transports the bulk material to be pelletized through the feed opening and into the pressing region of the working pressure roller 6. The force-feed mechanism may be realized in the form of a material feed channel that is composed of a vertical feed pipe and a horizontal feed screw channel that is arranged on its lower end and leads into the feed opening 14. A feed screw extending up to the edge of the annular die 1 is rotatably mounted in the feed screw channel. The feed screw preferably has a progressive screw thread such that the material to be pelletized is compressed during its transport into the compaction chamber 5, wherein this causes the material to expand when it enters the compaction chamber 5 and to thereby be transported into the depth of the compaction chamber 5. The utilization of a feed screw respectively makes it possible to realize the compaction chamber 5 with a great depth or to realize the annular die 1 with a great width such that the number of pressing channels 2 and thereby the capacity of the entire apparatus can be increased.

It is essential for the invention that the large working pressure roller 6 is arranged behind the feed opening 14 referred to the rotating direction 12 such that the material fed into the compaction chamber 5 through the material feed channel is immediately compacted by the pressure roller 6 and pressed through the pressing channels 2. The feed opening 14 is furthermore arranged slightly above the pressing region such that bulk material also ends up in the pressing region due to the force of gravity.

The die-formed articles exiting the pressing channels 2 are cut into pellets by means of a cutting knife 24, wherein the cutting knife is arranged on the outer surface 4 of the annular die 1 behind the working pressure roller 6 referred to the rotating direction 12. The cutting device can be angularly and vertically adjusted such that it can also serve as a knock-off device. A direct cooling apparatus on the cutting device prevents strings from being pulled during the cutting process.

The diameter of the pellets usually lies between 4 and 24 mm depending on the use of the pellets in processed materials or raw materials, wherein the pellet length should approximately amount to 1.5-times the pellet diameter. A pellet with a diameter of 6 mm therefore has a length of approximately 8 to 9 mm.

Since the introduced bulk material is almost completely compressed during the compaction process by the working pressure roller 6 and the proportion of fine fraction being produced is very small, only little material is located in the compaction chamber 5 outside the region between the feed opening 14 and the contact point 25 between the working pressure roller 6 and the annular die 1 such that no noteworthy material turbulences occur, wherein such material turbulences lead in conventional apparatuses to a significant heat distribution and heating of the material to be compacted, and wherein the dust and steam being developed furthermore form a sludge mixture that accumulates on and between the pressing tools and leads to malfunctions.

The spacing between the outer surface 8 of the pressure roller 6 and the inner surface 3 of the annular die is slowly increased by slowly adjusting the rotational axis 10 of the working pressure roller 6 along the diameter line D of the annular die 1 such that a slab 16 of bulk material can form on the inner surface 3 of the annular die 1.

Due to the inventive arrangement of the pressure rollers 6, 7 and the feed opening 14 in comparison with conventional apparatuses, a compaction with defined heat conditions is achieved because the cool bulk material introduced through the feed opening 14 is directly fed to the working pressure roller 6 without being subjected to turbulences, as well as completely compacted and pressed into the pressing channels 2. The bulk material to be pelletized therefore is neither subjected to turbulences nor heated prior to being compacted and pressed into the pressing channels such that the risk of melting the plastic—before it is pressed into the die—and smearing the apparatus is also eliminated if the bulk material has a high plastic content. The holding time of the material to be pelletized in the compaction chamber 5 is therefore very short and the continuous feed of fresh and cool bulk material furthermore results in permanent cooling of the compaction chamber 5. The inventive apparatus therefore makes it possible to maintain a lower temperature in the compaction chamber 5 whereas the frictional heat leads to higher temperatures in the pressing channels 2—due to the length of the pressing channels.

It was surprisingly determined that waste material to be pelletized with the inventive apparatus requires less drying, wherein a relatively high moisture content can in fact be tolerated and even causes a cooling effect due to the evaporation of the water content when the bulk material to be pelletized contacts the annular die 1 after it has reached its operating temperature such that the correspondingly high feed rate of cool bulk material to be pelletized even prevents undesirable heating in the compaction chamber 5 at very high material throughputs and the condensation is prevented from binding with the dust and the fine fraction, adhering to the intermediate spaces between the pressure rollers and potentially causing a blockage.

Since the bulk material to be pelletized is a barely heated in the compaction chamber 5, it is essentially only heated by the frictional heat generated during the passage through the pressing channels 2. This frictional heat can be exactly defined with the length of the pressing channels. The inventive apparatus therefore can feature an annular die with greater wall thickness and correspondingly longer pressing channels than conventional apparatuses because the flat feed angle enables the pressure roller to exert a significantly higher radial compressive force without producing a smearing effect.

The compaction and temperature states of the die-formed articles in the pressing channels can be exactly defined with the length of the pressing channels because the frictional heat occurring for the respective materials to be pelletized is well known. The adjustable pressure rollers furthermore make it possible to build up a slab of bulk material in order to additionally regulate frictional conditions of the type produced due to the length of the pressing channels. Consequently, the consistency of the die-formed articles can be exactly adjusted with the inventive apparatus such that conventional cutting problems of the type occurring, e.g., due to pulling strings of the molten plastic material are reduced when the pellets are cut by the cutting knife 24 and the desired firmness of the pellets is simultaneously ensured.

Figure 5:
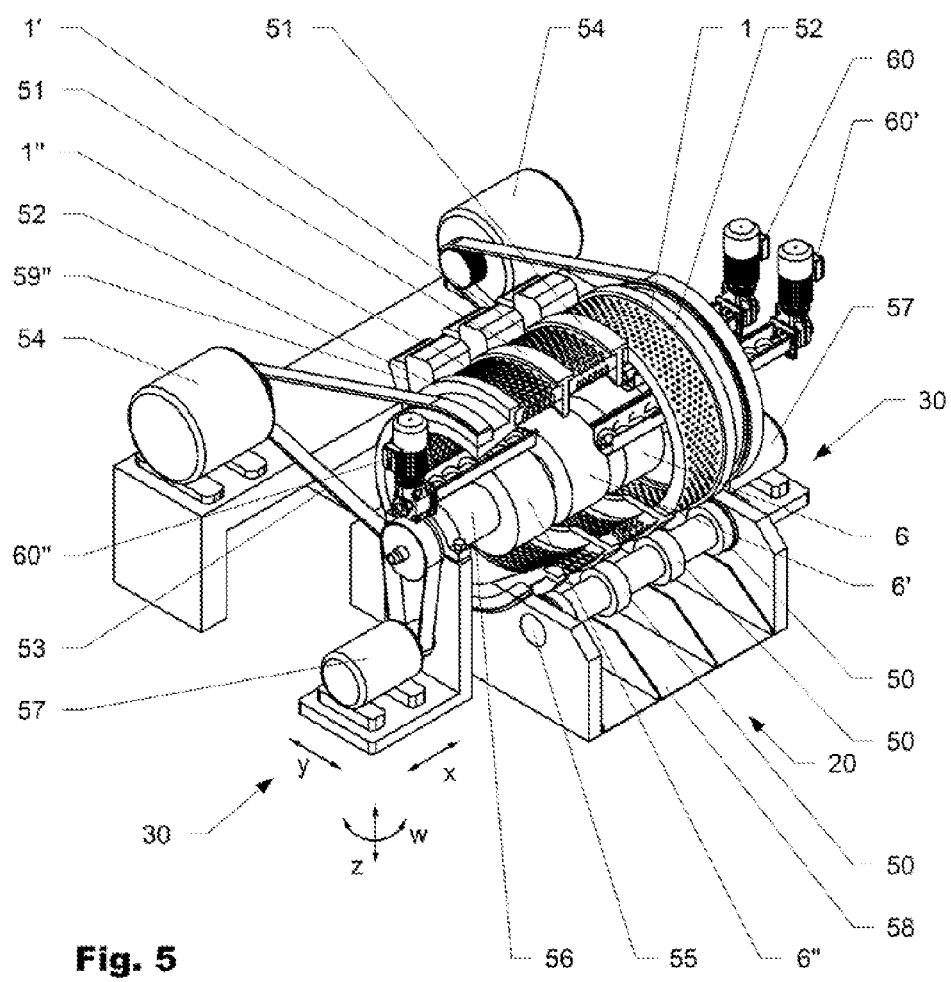
FIG. 5 shows a perspective front view of an embodiment of the apparatus with three annular dies and direct mounting.
Figure 6:
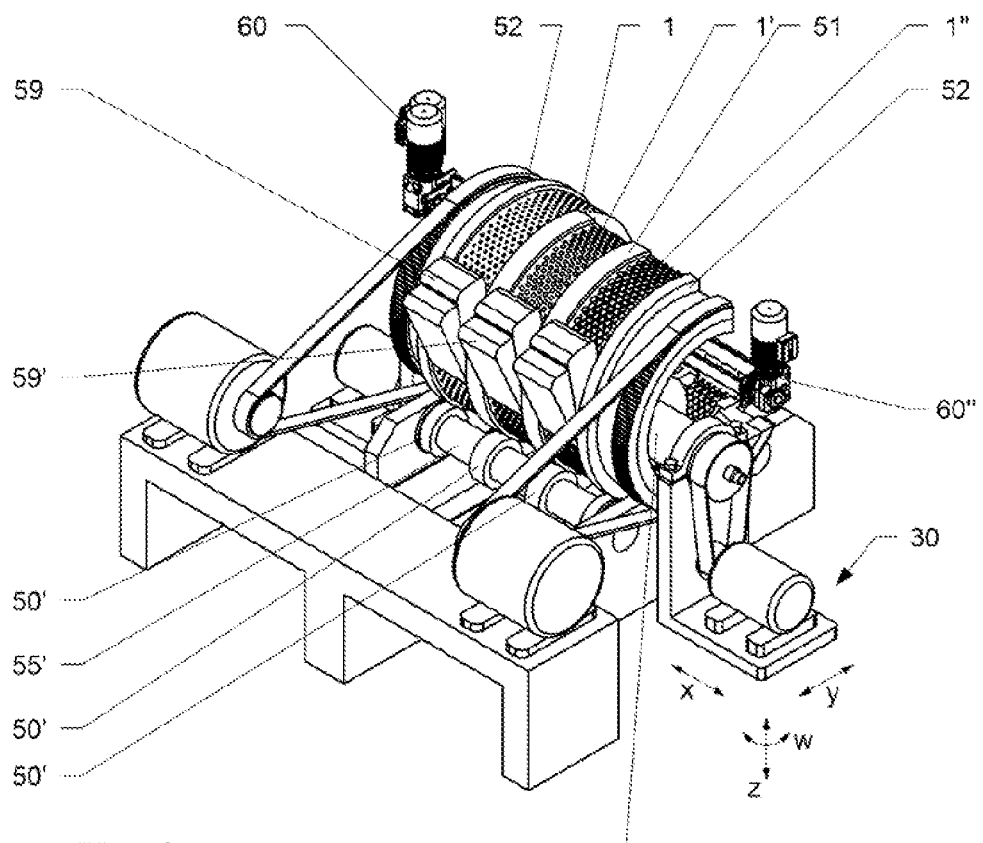
FIG. 6 shows a perspective rear view of an embodiment of the apparatus with three annular dies and direct mounting.
Figure 7:
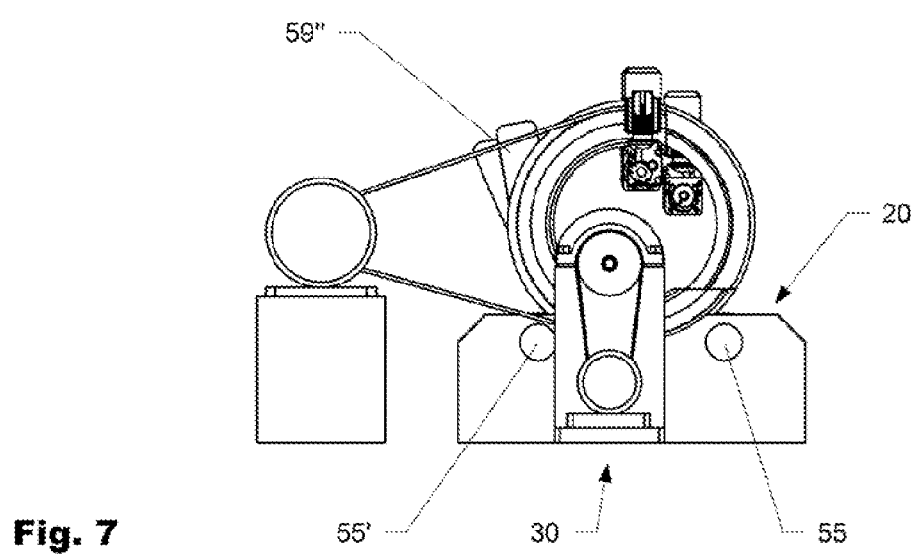
FIG. 7 shows a side view of the apparatus according to FIG. 5 and FIG. 6.

FIG. 5 and FIG. 6 respectively show perspective front and rear views of a pelletizing or granulating apparatus with three annular dies 1, 1', 1", in which two annular dies 1', 1" are illustrated in a partially sectioned fashion. FIG. 7 shows a side view of the apparatus according to FIG. 5 and FIG. 6.

The respective annular dies 1, 1', 1" are connected to one another, e.g. screwed to one another, by means of connecting flanges 51. An outer flange 52 is respectively arranged on the two outer annular dies 1, 1" and a belt 53 of a drive unit 54 respectively engages on the outer circumference of the outer flanges. The annular dies 1, 1', 1" and the flanges 51, 52 jointly form a drum of sorts which is rotatably mounted on several bearing roll pairs by means of the flanges, wherein the bearing roll pairs comprise a front bearing roll 50 and a rear bearing roll 50'. In the apparatus according to FIG. 6, the front and rear bearing rolls are respectively arranged on a front and a rear axis 55, 55', wherein the axes 55, 55' or the front and rear bearing rolls 50, 50' are spaced apart from one another in such a way that the drum is mounted in a stable fashion due to its own weight. It would also be possible to use two rolling bearings arranged in parallel instead of the bearing rolls.

The three working pressure rollers 6, 6', 6" are arranged on a working pressure roller shaft 56 that extends through the drum with the annular dies 1, 1', 1" in the axial direction. The working pressure roller shaft 56 is mounted on a second machine body 30 on both sides. In the apparatus shown, the working pressure roller shaft is respectively driven by a drive unit 57 on both sides. The second machine body 30 and the support/mounting of the working pressure roller shaft 56 are respectively realized in such a way that the working pressure rollers 6, 6', 6" can be displaced relative to the annular dies 1, 1', 1" in the direction of the rotational axis of the annular dies 1, 1', 1" (arrow x). The spacing between the working pressure rollers 6, 6', 6" and the annular dies 1, 1', 1" also can be variably adjusted with the above-described displaceability (arrows y, z) of the working pressure rollers 6, 6', 6". When only one working pressure roller is used (see FIG. 8), the second machine body 30 and the support/mounting of the working pressure roller shaft 56 particularly may be realized such that an inclination about the z-axis (arrow w) is possible.

A delivery unit 58, e.g., in the form of a guide plate, a chute or a conveyor belt is respectively arranged underneath the drum or the annular dies 1, 1', 1" in order to transport away the pellets knocked off by means of a knock-off or cutting device 59, 59', 59".

Feed mechanisms 60, 60', 60" for feeding bulk material are respectively arranged on both sides of the annular dies or the drum and respectively supply one annular die 1, 1', 1" with bulk material.

Figure 8:
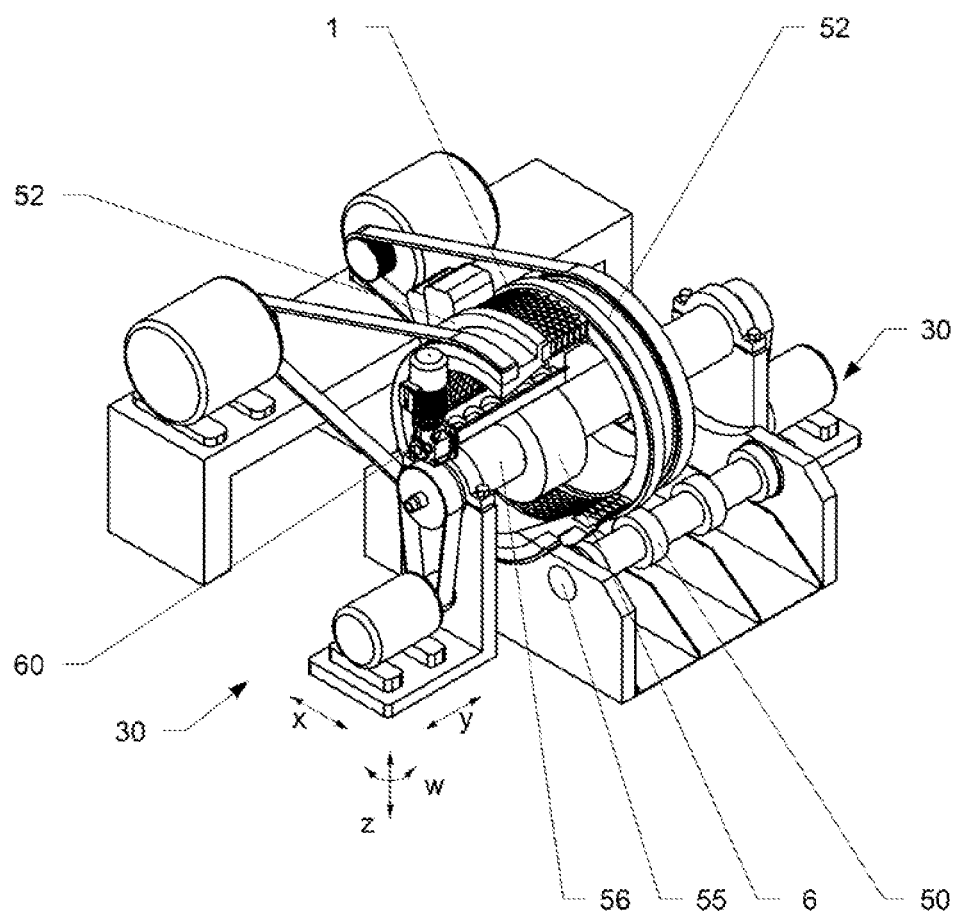
FIG. 8 shows a perspective front view of an embodiment of the apparatus with one annular die and direct mounting.

FIG. 8 shows a perspective view of a pelletizing or granulating apparatus that in contrast to the apparatus according to FIGS. 5 to 7 only features one annular die 1 and one working pressure roller 6.

LIST OF REFERENCE SYMBOLS

1, 1', 1" Annular die
2 Pressing channels
3 Inner surface
4 Outer surface
5 Compaction chamber
6, 6', 6" Working pressure roller
8 Outer surface of working pressure roller 6
10, 10', 10" Rotational axis of working pressure roller 6
12 Rotating direction of annular die 1
13 Rotational axis of annular die 1
14 Feed opening
15 Knock-off or cutting device
16 Slab of bulk material
20 First machine body
21 Shaft
22 Hydraulic motor
30 Second machine body
31 Shaft
32 Hydraulic motor
40 Foundation
41 Sliding bearing
42 Sliding bearing
43 Sliding bearing
44 Carrier
50, 50' Front and rear bearing rolls
51 Connecting flanges
52 Outer flange
53 Belt
54 Drive unit
55, 55' Front and rear axes
56 Working pressure roller shaft
57 Drive unit
58 Delivery unit
59 Knock-off or cutting device
60 Feed mechanism
D Diameter line of annular die 1
DH Horizontal diameter line of annular die 1
DV Vertical diameter line of annular die 1

The invention claimed is:

1. An apparatus for producing pellets from bulk material containing meltable fractions, the apparatus comprising:
a plurality of annular dies assembled to a drum, rotatably mounted on bearing rolls or roller bearings, and connected by intermediately arranged connection flanges, each of the plurality of annular dies having a horizontal rotational axis extending through its center such that each can be driven in a rotating direction by a drive unit;
a compaction chamber formed by the plurality of annular dies;
radially-oriented pressing channels formed in each of the plurality of annular dies, the radially-oriented pressing channels extending from an inner surface of each of the plurality of annular dies to an outer surface of each of the plurality of annular dies;
a plurality of working pressure rollers arranged in the compaction chamber defined by the plurality of annular dies, the plurality of working pressure rollers configured for compacting and pressing the bulk material into the radially-oriented pressing channels; and
a working pressure roller shaft holding the plurality of working pressure rollers, the working pressure roller shaft extending through the plurality of annular dies and mounted on both sides outside of the plurality of annular dies.

2. The apparatus according to claim 1, further comprising a first machine body in which the plurality of annular dies is rotatably mounted and a second machine body in which the plurality of working pressure rollers is rotatably mounted.

3. The apparatus according to claim 2, wherein at least one of the first and second machine bodies is displaceably mounted on a foundation or on a superstructure such that the plurality of working pressure rollers is displaceable relative to the plurality of annular dies in a direction of the horizontal rotational axis of each of the plurality of annular dies.

4. The apparatus according to claim 3, wherein the plurality of annular dies and the plurality of working pressure rollers are horizontally displaceable relative to the foundation or to the superstructure perpendicular to the horizontal rotational axis of each of the plurality of annular dies.

5. The apparatus according to claim 3, wherein the plurality of working pressures rollers is vertically displaceable perpendicular to the horizontal rotational axis of each of the plurality of annular dies.

6. The apparatus according to claim 1, further comprising outer flanges mounting the plurality of annular dies to the bearing rolls or to the roller bearings.

7. The apparatus according to claim 6, wherein the drive unit comprises a belt configured for engaging an outer circumference of the outer flanges.

8. The apparatus according to claim 6, wherein the connection flanges or the outer flanges protrude radially inward over the plurality of annular dies forming individual compaction chambers.

9. The apparatus according to claim 1, wherein the working pressure roller shaft is hollow forming a cooling water connection configured for cooling the plurality of working pressure rollers.

10. The apparatus according to claim 1, wherein the radially-oriented pressing channels of each of the plurality of annular dies have different diameters or different lengths.

11. The apparatus according to claim 1, wherein the working pressure roller shaft is separable with a divided flange or with overlapping regions of two shaft sections engaged in a form-fitting and torque-proof engagement.

12. The apparatus according to claim 1, further comprising a feed mechanism for the bulk material, the feed mechanism including a material outlet leading into the compaction chamber.

13. The apparatus according to claim 12, wherein the material outlet is arranged in front of the working pressure rollers with respect to a rotating direction of the plurality of annular dies and underneath a horizontal diameter line (DH) of the plurality of annular dies.

14. The apparatus according to claim 1, further comprising a plurality of feed mechanisms arranged on both sides of the plurality of annular dies, each of the plurality of feed mechanisms providing one of the plurality of annular dies with bulk material.

15. The apparatus according to claim 1, wherein the plurality of annular dies and the plurality of working pressure rollers have a width up to 500 mm.

16. The apparatus according to claim 1, wherein the plurality of annular dies and the plurality of working pressure rollers have a width in a range between 350 mm and 500 mm.

* * * * *